Feb. 24, 1959  K. A. KLINGLER  2,874,929
TWO-WAY BALL VALVES
Filed July 28, 1955  2 Sheets-Sheet 1
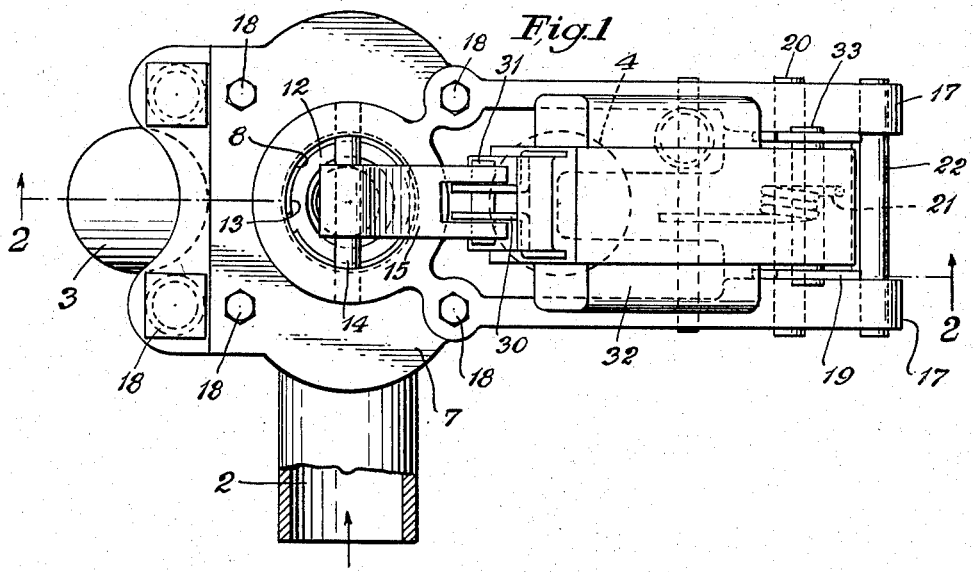
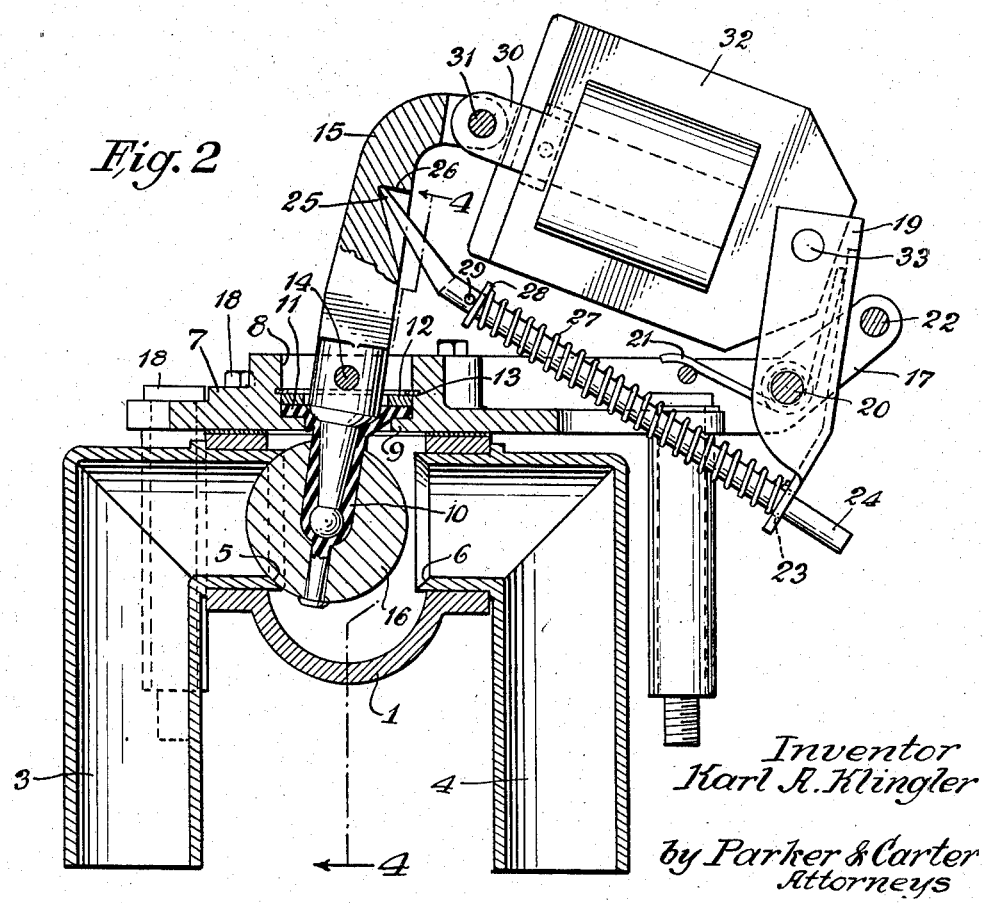
Inventor
Karl A. Klingler
by Parker & Carter
Attorneys Feb. 24, 1959  K. A. KLINGLER  2,874,929
TWO-WAY BALL VALVES Filed July 28, 1955  2 Sheets-Sheet 2

Inventor
Karl A. Klingler by Parker & Carter
Attorneys

United States Patent Office 2,874,929
Patented Feb. 24, 1959

2,874,929

TWO-WAY BALL VALVES

Karl A. Klingler, Naperville, Ill.

Application July 28, 1955, Serial No. 524,974

10 Claims. (Cl. 251—129)

My invention relates to improvements in two-way valves and has for one object to provide for such a valve, a suitable electric operating mechanism.

Another object is to provide a valve wherein the parts may be easily and quickly assembled and disassembled wherein leakage between the valve member and the actuating mechanism will be prevented and wherein accurate opening and closing may take place during the entire life of the valve.

The valve will be solenoid actuated. A solenoid works in one direction only. A two-way valve has two positions. A spring seats it in one position, the solenoid overcomes the spring and applies enough additional pressure to unseat the valve from the first position and seat it in the second position. The solenoid must be able to complete its full excursion. A yielding connection permits the solenoid after the valve is seated to continue its travel to the end.

I have illustrated my invention as applied to a ball valve though obviously other valves might be used.

Other objects will appear from time to time throughout the specification and claims.

My invention is illustrated more or less diagrammatically in the accompanying drawings, wherein—

Figure 1 is a plan view;

Figure 2 is a section with parts in elevation along the line 2—2 of Figure 1 showing the valve seated in one position by the solenoid;

Like parts are indicated by like characters throughout the specification and drawings.

Figure 3:
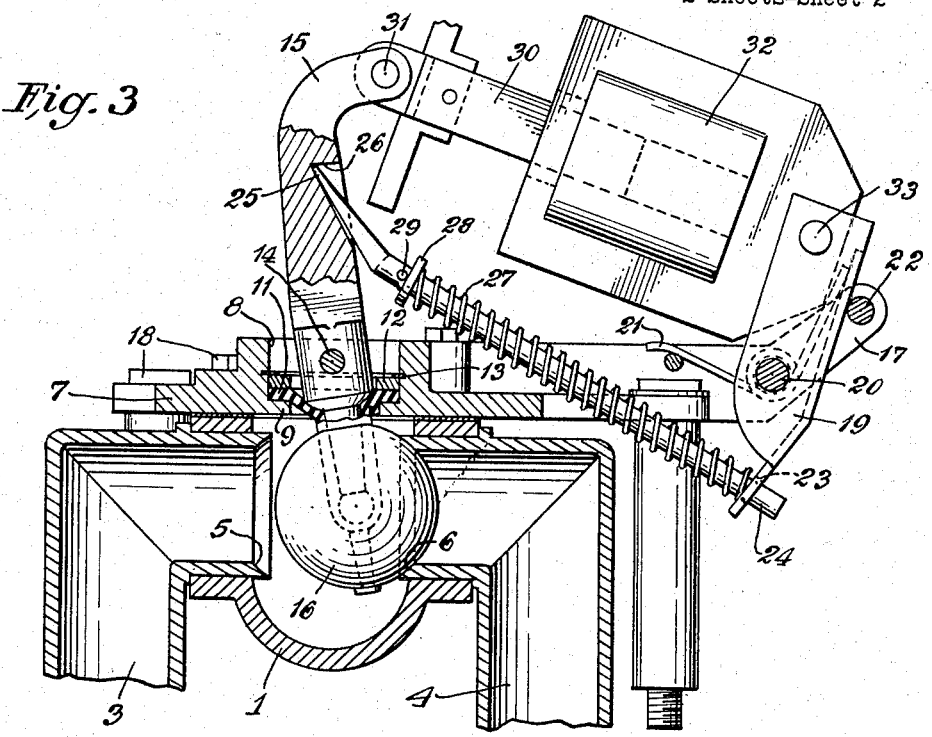
Figure 3 is a section similar to Figure 2 showing the valve seated in the opposite position by the spring.
Figure 4:
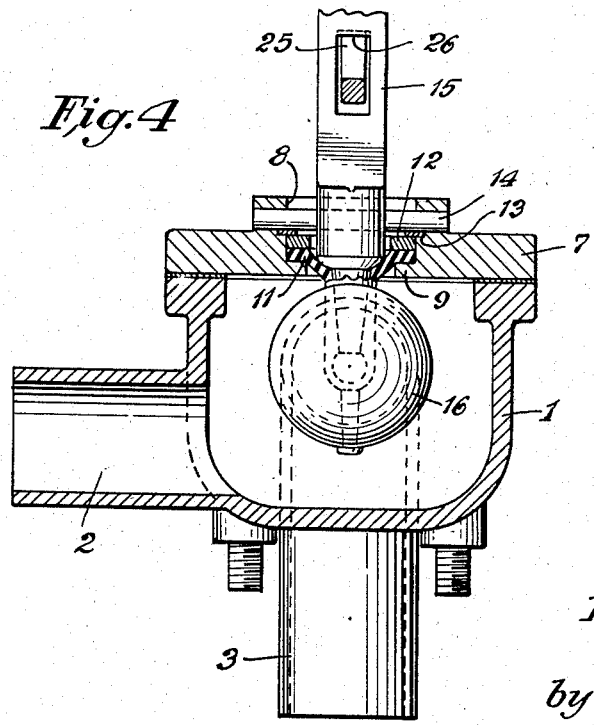
Figure 4 is a section in part elevation along the line 4—4 of Figure 2.

1 is a valve body adapted to receive fluid under pressure through the duct 2. 3 and 4 are discharge ducts communicating with the valve body and having opposed valve seats 5 and 6. 7 is a valve body cover. It is apertured at 8, the inboard portion of the aperture being flanged as at 9. 10 is a sleeve of rubber or rubber-like material flanged exteriorly at 11 to engage the flange 9. 12 is a holding ring engaging the upper face of the flange 11 locked in place by spring ring 13 to hold the flange 11 in fluid-tight engagement with the flange 9.

14 is a pivot pin carried by the valve cover 7 on which is pivotally mounted the valve actuating lever 15. The lever 15 projects below the pin 14 into the sleeve 10 and into the housing. 16 is a valve ball encircling and locked in position on the sleeve 10 adapted to contact one or other of the seats 5, 6.

17 is a bracket projecting laterally from the valve housing cover. The cover being held in place by cap screws 18. 19 is a compensating lever pivoted at 20 on the bracket 17 and biased by the spring 21 into engagement with the stop 22. The lever 19 is apertured at 23 to permit passage of the tail of a spring plunger 24, which spring plunger at the opposite end carries a knife blade 25 engaging a notch 26 in the valve actuating lever 15. 27 is a spring encircling the plunger 24 abutting at one end on the tail, at the other end on a collar 28 pinned at 29 to the plunger 24 so that the thrust of the spring 27 seats the ball valve 16 against the seat 6 when the solenoid is not actuated as indicated in Figure 3. It will be noted that in this case the solenoid plunger 30, pivoted at 31 to the valve actuating lever 15 is in the open position with respect to the solenoid 32. The solenoid 32 is pivoted at 33 on the lever 19.

When the solenoid is energized, the plunger 30 moves from the position shown in Figure 3 to the position shown in Figure 2. The limit of the excursion of the solenoid plunger is greater than that needed to move the valve 16 from contact with seat 6 to contact with seat 5. As the plunger moves inwardly in the solenoid, the valve 16 is first seated while the lever 19 remains in contact with the stop 22. Further relative movement between the solenoid plunger 30 and the solenoid body 32 compresses the spring 21 and moves the lever 19 away from the stop 22, thus permitting a complete solenoid plunger excursion.

When current is turned off, the solenoid, the springs 27 and 21 are no longer compressed and they expand bringing the parts back to the position shown in Figure 3.

The use and operation of my invention are as follows:

In Figure 2, the valve is shown in the position it assumes when seated by the energized solenoid. In Figure 3, it is shown in the position when seated by the valve actuating spring.

Starting with Figure 3, the valve lever is biased in counter clockwise direction by the valve actuating spring. The solenoid is at rest, is negative. The solenoid plunger is in the extended position and the solenoid lever is biased by the solenoid spring against the solenoid stop, the solenoid spring being strong enough to prevent movement of the solenoid lever in counter clockwise direction so that the solenoid lever furnishes a firm abutment for the valve actuating spring.

We can say for example, that two pounds pressure is needed to hold the valve on its seat and that two pounds pressure must be exerted upon the valve in whichever direction is necessary to seat the valve and in the position shown in Figure 3, the valve spring furnishes that pressure.

If the solenoid is energized, the solenoid plunger is drawn in, the valve lever is rotated in clockwise direction, the valve is unseated from its right hand position and seated in the left hand position further compressing the valve actuating spring, the solenoid spring being strong enough to still maintain the solenoid lever seated against its stop even though the pressure on the valve actuating spring has been increased.

When the valve reaches its left hand position, the valve lever will have moved in clockwise direction as far as it can go, the valve engaging the seat, providing a positive stop, but the solenoid plunger will not have completed its excursion. At this time, since further movement of the plunger to the right is impossible, Mahomet goes to the mountain and the solenoid moves to the left, rotating the solenoid lever against the solenoid spring but because the tail of the solenoid lever furnishes the abutment for the valve actuating spring, the resultant counterclockwise movement of the solenoid lever moves the valve actuating spring abutment to the right and relieves the pressure on that spring, thus reducing the pressure which the solenoid must provide.

Assuming again that the valve spring seats the valve with two pounds pressure, in the position of Figure 3, then when the solenoid is energized, the solenoid provides two pounds necessary to unseat the valve from its right hand position. The solenoid also provides the additional force needed to move the valve from its right hand to its left hand seat in addition to the two pounds pressure required to unseat the valve and when the valve is seated in the left hand position, the solenoid must furnish at least two pounds additional to provide the pressure necessary to make a tight fit between the valve and the seat.

Since the solenoid by its very nature must be able to move its full excursion before it comes to rest and since valves can wear and it is not practically possible to micrometrically adjust the valve movement and solenoid excursion, I take advantage of this situation by giving the solenoid plunger a greater excursion than that needed simply to move the valve from one position to the other. The two valve seats furnish in effect positive stops to limit valve movement and limit valve lever movement and when the valve has reached that stop on the lever and valve lever movement is no longer possible, then as the solenoid goes on to apply the additional pressure, the two pounds shall we say to hold the valve in its left hand seated position, the solenoid moves to the left, moving the tail of the solenoid lever to the right and so relieving some of the pressure exerted by the lever against the valve actuating spring.

Therefore, I am able by this arrangement first to insure that no matter what the valve conditions are, the solenoid will be able to make a complete excursion and not be held from reaching the end of its path and the pressure provided by the solenoid will be substantially reduced, making possible a smaller, lighter structure.

The solenoid or any other power element must furnish power to do the following three things:

(1) To overcome the residual force exerted by spring 27 in the position illustrated in Figure 3, i. e., the amount of force which this spring exerts to hold the valve against seat 6.

(2) To supply the power to move the valve from seat 6 to the position in which it just contacts seat 5, which movement, in addition to overcoming friction, must compress spring 27 by the amount of movement of lever 15.

In order to avoid additional drawings, the position of the parts when the valve just contacts the seat 5 is not illustrated. At such time the valve 16, lever 15, rod 24 and plunger 30 would be in the respective positions illustrated in Figure 2, whereas the lever 19 and the solenoid coil 32 would be in the position illustrated in Figure 3.

(3) To overcome any residual loading of spring 21 which this spring might have with the parts in the positions described in (2) above and to compress spring 21 sufficiently to move lever 19 and solenoid coil 32 from the position illustrated in Figure 3 to the position illustrated in Figure 2. During this latter movement in which a strong spring 21 is compressed, the weaker spring 27 would be permitted to expand from the compressed position described in (2) above to the less compressed position illustrated in Figure 2, so that the net power required for this latter movement would be the power necessary to compress strong spring 21 less the power exerted by weaker spring 27 in moving from the position described in (2) above to the Figure 2 position.

I claim:

1. Valve control means including an actuating lever mounted for rotation about an axis generally perpendicular to its length, stops positively limiting the excursion of the lever in opposite directions about such axis, yielding means adapted to force the lever into engagement with one of the stops, a solenoid connected to the lever, adapted when energized to overcome the yielding means and move the lever into engagement with the second stop, and solenoid actuated means operative after the lever has engaged and while it is still in engagement with the second stop to reduce the force applied by the yielding means to the lever.

2. Valve control means including an actuating lever mounted for rotation about an axis generally perpendicular to its length, stops positively limiting the excursion of the lever in opposite directions about such axis, yielding means adapted to force the lever into engagement with one of the stops, a solenoid comprising a plunger member and a coil member, one of said members being connected to the lever, said solenoid, adapted when energized to overcome the yielding means and move the lever into engagement with the second stop, and means actuated by movement of the other solenoid member after the lever has engaged the second stop to reduce the force applied by the yielding means to the lever, the means actuated by said other solenoid member including a solenoid lever pivotally supporting the other solenoid member, a stop for the solenoid lever, an abutment for the yielding means carried by the solenoid lever, spring means stronger than said yielding means biasing the solenoid lever against its stop and against the yielding means.

3. Valve control means including an actuating lever mounted for rotation about an axis generally perpendicular to its length, stops positively limiting the excursion of the lever in opposite directions about such axis, yielding means adapted to force the lever into engagement with one of the stops, a solenoid comprising a plunger member and a coil member, one of said members being connected to the lever, said solenoid, adapted when energized to overcome the yielding means and move the lever into engagement with the second stop, and means actuated by movement of the other solenoid member after the lever has engaged the second stop to reduce the force applied by the yielding means to the lever, the means actuated by said other solenoid member including a solenoid lever pivotally supporting the other solenoid member, a stop for the solenoid lever, an abutment for the yielding means carried by the solenoid lever, spring means stronger than said yielding means biasing the solenoid lever against its stop and against the yielding means, the solenoid being adapted, after the actuating lever has engaged the second stop to rotate the solenoid lever against the spring means and retract the abutment in a direction opposite to the direction of the force applied by the yielding means against the actuating lever.

4. In combination, a pair of opposed valve seats, a valve movable between, toward and from one or the other of them, a valve actuating lever a fulcrum therefor, a valve spring biasing the lever in one direction to cause the valve to engage one of the seats, a solenoid comprising a plunger member and a coil member, one of said members being in opposition to the spring adapted when energized to overcome it and move the lever in the opposite direction to cause the valve to engage the second seat, a solenoid lever upon which one of the solenoid members is mounted, a stop in the path of the solenoid lever, an abutment for the valve spring carried by the solenoid lever, yielding means stronger than the valve spring biasing the solenoid lever against the stop, the solenoid being adapted when the valve engages the second seat to move the solenoid lever away from its stop and move the valve spring abutment in the direction opposite to the direction of the pressure applied by it to the valve lever.

5. In combination, a pair of opposed stops, an actuating lever pivoted for angular movement between them, yielding means biasing the lever into engagement with one of the stops, a solenoid comprising a plunger member and a coil member, one of said members being adapted to overcome the bias and cause the lever to engage the other stop, a pivoted lever supporting the one of the solenoid members, a connection between the other solenoid member and the actuating lever, a stop for the solenoid lever and yielding means stronger than the yielding means biasing the actuating lever biasing the solenoid lever against the stop in the direction away from the actuating lever the solenoid lever being free to leave its stop responsive to the pull of the solenoid after movement of the actuating lever is prevented by engagement with the second of said stops.

6. In combination, a pair of opposed stops, an actuating lever pivoted for angular movement between them, yielding means biasing the lever into engagement with one of the stops, a solenoid comprising a plunger member and a coil member, one of said members being adapted to overcome the bias and cause the lever to engage the other stop, a pivoted lever supporting the one of the solenoid members, a connection between the other solenoid member and the actuating lever, a stop for the solenoid lever and yielding means stronger than the yielding means biasing the actuating lever, biasing the solenoid lever against the stop in the direction away from the actuating lever the solenoid lever being free to leave its stop responsive to the pull of the solenoid after movement of the actuating lever is prevented by engagement with the second of said stops, an abutment for the yielding means carried by the solenoid lever and mounted to move with the solenoid lever away from the yielding means when the solenoid lever leaves its stop.

7. A valve actuating mechanism including a pivotally mounted valve lever, a valve carried thereby, there being associated therewith two opposed valve seats, the valve seats serving as stops to positively limit angular movement of the valve actuating lever, a solenoid, including a plunger member and a coil member, a pivotally mounted solenoid lever, one of the solenoid members being pivoted on the valve actuating lever and the other on the solenoid lever, the solenoid lever including an abutment on the end thereof furthest from the solenoid, a valve actuating spring interposed between the abutment and the valve lever, a stop for the solenoid lever, yielding means biasing the solenoid lever against its stop whereby the valve spring holds the valve lever in one position, the solenoid being adapted when energized to rotate the valve lever into the second position to compress the valve spring and to overcome the bias force applied to the solenoid lever, to lift the solenoid lever from its stop and by displacement of the abutment reduce the pressure applied to the actuating lever by the valve actuating spring the solenoid lever yielding means being stronger than the valve spring.

8. A valve actuating mechanism including a pivotally mounted valve lever, a valve carried thereby, opposed valve seats serving as stops to positively limit angular movement of the lever, a solenoid including two relatively movable elements one connected to the valve lever, a solenoid lever to which the other is connected, a valve actuating spring interposed between the valve lever and the solenoid lever, the solenoid lever being pivoted between the spring and the solenoid, a stop for the solenoid lever, yielding means stronger than the valve actuating spring biasing the solenoid lever against its stop and against the valve spring, the valve spring being adapted when the solenoid is not energized to seat the valve against one stop, the solenoid being adapted when energized to overcome the valve spring and seat the valve against the other stop, the normal excursion of the solenoid being greater than that permitted by valve lever movement between the stops, the strength of the solenoid being sufficient to overcome the bias applied to the solenoid lever to move the solenoid lever from its stop and reduce the pressure applied by the solenoid lever to the valve actuating spring.

9. In combination, an actuating lever mounted for pivotal movement about a fulcrum, stops limiting the angular movement thereof, and yielding means biasing said actuating lever against one of said stops, power means adapted when energized to overcome the yielding means and angularly displace the lever until it engages the second stop, the power means being adapted during the time that the lever is engaged with the second stop to reduce the pressure exerted by the biasing means in opposition to the force exerted by the power means, supporting means for said power means, said supporting means including a second lever pivotally supporting the power means, a stop for said second lever, a spring stronger than the biasing means holding said second lever against its stop, the second lever furnishing an abutment for the biasing means whereby the force exerted by the power means after the first lever has completed its excursion will rotate the second lever to compress its spring and move the abutment in a direction opposite to the direction of force applied by the biasing spring to the first lever.

10. In combination, an actuating lever mounted for pivotal movement about a fulcrum, stops limiting the angular movement thereof, yielding means biasing said actuating lever against one of said stops, power means adapted when energized to overcome the yielding means and angularly displace the lever until it engages the second stop, the power means being adapted during the time that the lever is engaged with the second stop to reduce the pressure exerted by the biasing means in opposition to the force exerted by the power means, supporting means for said power means, said supporting means including a stop for said power means and a second yielding means biasing the power means against its stop in a direction opposite to the direction of movement of the lever toward its second stop, the second yielding means being stronger than the first yielding means, whereby after the force exerted by the power means has moved the actuating lever into engagement with its second stop, continued application of such force will overcome the second yielding means and lift the power means away from its stop toward the actuating lever.

References Cited in the file of this patent

UNITED STATES PATENTS

| | | |
|---|---|---|
| 1,331,290 | Stratton | Feb. 17, 1920 |
| 2,562,631 | Morrison | July 31, 1951 |
| 2,694,414 | Seyferth | Nov. 16, 1954 |